(12) United States Patent
Hoard et al.

(10) Patent No.: US 6,363,714 B1
(45) Date of Patent: Apr. 2, 2002

(54) PLASMA-CATALYST CONTROL SYSTEM

(75) Inventors: John W. Hoard, Livonia; Paul Matthew Laing, Canton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/590,984

(22) Filed: Jun. 9, 2000

(51) Int. Cl.$^7$ ................................................. F01N 3/00
(52) U.S. Cl. ........................ 60/275; 60/274; 422/186.04
(58) Field of Search .......................... 60/274, 275, 285, 60/301; 422/186.04, 186.28

(56) References Cited

U.S. PATENT DOCUMENTS

| | | | | |
|---|---|---|---|---|
| 5,155,994 A | * | 10/1992 | Muraki et al. ................. | 60/275 |
| 5,419,123 A | * | 5/1995 | Masters ........................ | 60/274 |
| 5,423,180 A | * | 6/1995 | Nobue et al. .................. | 60/275 |
| 5,655,210 A | * | 8/1997 | Gregoire et al. ........ | 422/186.04 |
| 5,711,147 A | | 1/1998 | Vogtlin et al. | |
| 5,822,981 A | * | 10/1998 | Williamson et al. .......... | 60/275 |
| 5,836,154 A | | 11/1998 | Williamson et al. | |
| 5,855,855 A | | 1/1999 | Williamson et al. | |
| 5,866,081 A | | 2/1999 | Williamson et al. | |
| 5,893,267 A | * | 4/1999 | Vogtlin et al. ................. | 60/275 |
| 5,970,706 A | | 10/1999 | Williamson et al. | |
| 6,038,853 A | * | 3/2000 | Penetrante et al. ........... | 60/274 |
| 6,038,854 A | * | 3/2000 | Penetrante et al. ........... | 60/275 |
| 6,047,543 A | * | 4/2000 | Caren et al. .................. | 60/275 |
| 6,176,078 B1 | * | 1/2001 | Balko et al. .................. | 60/275 |
| 6,185,930 B1 | * | 2/2001 | Lepperhoff et al. ........... | 60/274 |

FOREIGN PATENT DOCUMENTS

| | | |
|---|---|---|
| EP | 0 825 694 A2 | 2/1998 |
| WO | 98/07500 | 2/1998 |

* cited by examiner

*Primary Examiner*—Thomas Denion
*Assistant Examiner*—Tu M. Nguyen
(74) *Attorney, Agent, or Firm*—Damian Porcari

(57) ABSTRACT

A system and method of controlling J/L specific energy deposition in accordance with either measured or estimated values of engine or vehicle operational parameters in order to optimize emission reduction versus energy cost over a driving cycle. A typical strategy varies the J/L specific energy deposition in relation to a measured or estimated value of a relevant parameter such as engine-out $NO_x$ concentration to improve energy cost versus emission performance over a driving cycle.

2 Claims, 3 Drawing Sheets

PLASMA-CATALYST CONTROL SYSTEM

TECHNICAL FIELD

This invention relates to plasma-catalyst systems and, more particularly, to a control system for reducing electrical power consumption in a plasma-catalyst system.

BACKGROUND ART

Certain compounds in the exhaust stream of a combustion process, such as the exhaust stream from an internal combustion engine, are undesirable and must be controlled in order to and meet government emissions regulations. Among the regulated compounds are hydrocarbons, soot particulates, and nitrogen oxide compounds ($NO_x$). There is a wide variety of combustion processes producing these emissions; for instance, coal or oil-fired furnaces, reciprocating internal combustion engines (including gasoline spark ignition and diesel engines), gas turbine engines, and so on. In each of these combustion processes, control measures to prevent or diminish atmospheric emissions of these emissions are needed.

Industry has devoted considerable effort to reducing regulated emissions from the exhaust streams of combustion processes. In particular, it is now common in the automotive industry to place a catalytic converter in the exhaust system of gasoline spark ignition engines to remove undesirable emissions from the exhaust by chemical treatment. Typically, a "three-way" catalyst system of platinum, palladium, and/or rhodium metals dispersed on an oxide support is used to oxidize carbon monoxide and hydrocarbons to water and carbon dioxide and to reduce nitrogen oxides to nitrogen. The catalyst system is applied to a ceramic substrate such as beads, pellets, or a monolith. When used, beads are usually porous, ceramic spheres having the catalyst metals impregnated in an outer shell. The beads or pellets are of a suitable size and number in the catalytic converter in order to place an aggregate surface area in contact with the exhaust stream that is sufficient to treat the compounds of interest. When a monolith is used, it is usually a cordierite honeycomb monolith and may be pre-coated with .gamma.-alumina and other specialty oxide materials to provide a durable, high surface area support phase for catalyst deposition. The honeycomb shape, used with the parallel channels running in the direction of the flow of the exhaust stream, both increases the surface area exposed to the exhaust stream and allows the exhaust stream to pass through the catalytic converter without creating undue back pressure that would interfere with operation of the engine.

When a spark ignition engine is operating under stoichiometric conditions or nearly stoichiometric conditions with respect to the fuel/air ratio (just enough oxygen to completely combust the fuel, or perhaps up to 0.3% excess oxygen), a "three-way" catalyst has proven satisfactory for reducing emissions. Unburned fuel (hydrocarbons) and oxygen are consumed in the catalytic converter, and the relatively small amount of excess oxygen does not interfere with the intended operation of the conventional catalyst system. The stoichiometric conditions or nearly stoichiometric conditions will be referred to as non-oxidizing conditions or as producing a non-oxidizing atmosphere.

However, it is desirable to operate the engine at times under lean burn conditions, with excess air, in order to improve fuel economy. While conventional non-oxidizing engine conditions might have a fuel-to-air mixture having .1–.3% excess oxygen, with perhaps a slightly greater amount in the exhaust as a result of incomplete combustion, a lean burn engine has a substantially greater excess of oxygen, from about 1% to perhaps up to 10% excess oxygen relative to the amount of fuel. Under lean burn conditions, conventional catalytic devices are not very effective for treating the $NO_x$ in the resulting oxygen-rich exhaust stream. Lean burn conditions will be referred to as oxidizing conditions or as producing an oxidizing atmosphere. The exhaust stream from a diesel engine also has a substantial oxygen content, from perhaps about 2–18% oxygen, and, in addition, contains a significant amount of particulate emissions. The particulate emissions, or soot, are thought to be primarily carbonaceous particles. It is also believed that other combustion processes result in emissions that are difficult or expensive to control because of, for instance, dilute concentrations of the compounds to be removed from the effluent stream or poor conversion of the compounds using conventional means.

In spite of efforts over the last decade to develop effective means for reducing $NO_x$ to nitrogen under oxidizing conditions in a spark ignition gasoline engine or in a diesel engine, the need for improved conversion effectiveness has remained unsatisfied. Moreover, there is a continuing need for improved effectiveness in treating emissions from any combustion process, particularly for treating the soot particulate emissions from diesel engines.

An alternative way to treat the hydrocarbon, particulate, or $NO_x$ emissions in an exhaust or effluent stream would be to destroy such emissions using a non-thermal plasma combined with a suitable catalyst (plasma-catalyst). It is known that plasma-catalyst reactors are useful to treat $NO_x$ and $SO_x$ emissions in power plant flue gases, and even to treat $NO_x$ or particulate emissions in diesel engine exhaust. However, systems now known in the art suffer from serious shortcomings. For example, such systems are run continually, which results in relatively large power consumption per unit of material destroyed, particularly when used to treat low concentration of emissions in effluent or exhaust streams.

FIGS. 1 and 2 show $NO_x$ mass flow rate (g/s) for each second during the FTP and MVEURO cycles respectively, plotted against measured exhaust volume flow (L/s). It can be seen that there is little relation between the two. FIGS. 3 and 4 show $NO_x$ concentration (ppm) versus exhaust flow. Here, it can be seen that there are modes with high exhaust flow but low $NO_x$ concentration. The present invention is directed to taking advantage of these relationships to reduce electrical power consumption by reducing plasma power during such modes.

DISCLOSURE OF INVENTION

In accordance with the present invention, a system and method of controlling power to a plasma-catalyst is provided that controls the plasma power in accordance with either measured or estimated values of engine or vehicle operational parameters in order to optimize emission reduction versus energy cost. A basic strategy delivers a constant energy to the plasma per standard volume (or mass) of engine exhaust, usually expressed as constant J/L. This improves energy efficiency over a constant plasma power delivery since the chemical conversion of a plasma-catalyst system is well known to vary with energy per volume, usually measured in Joules energy per Liter of exhaust. An added strategy varies the J/L energy delivery in relation to a measured or estimated value of a relevant parameter. For instance, engine-out and/or tailpipe $NO_x$ concentration is measured or estimated, and under conditions of high $NO_x$ production, higher energy deposition is commanded; while under lower $NO_x$ conditions, lower energy is commanded. This results in an improved energy cost versus emission performance.

BRIEF DESCRIPTION OF DRAWINGS

A more complete understanding of the present invention may be had from the following detailed description which should be read in conjunction with the drawings in which.

BEST MODE FOR CARRYING OUT THE INVENTION

Figure 1:
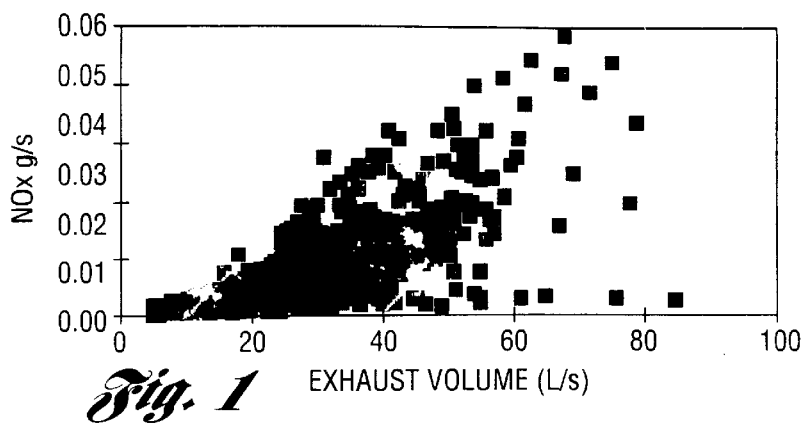
FIGS. 1 and 2 show $NO_x$ mass flow rate (g/s) for each second during the FTP and MVEURO cycles respectively, plotted against measured exhaust volume flow (L/s)
Figure 2:
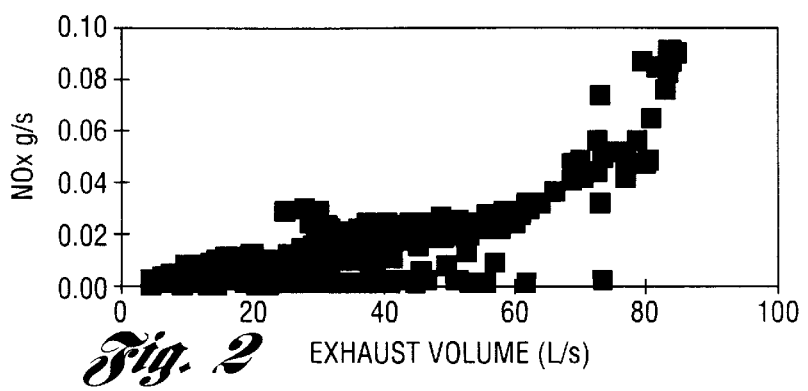
Figure 3:
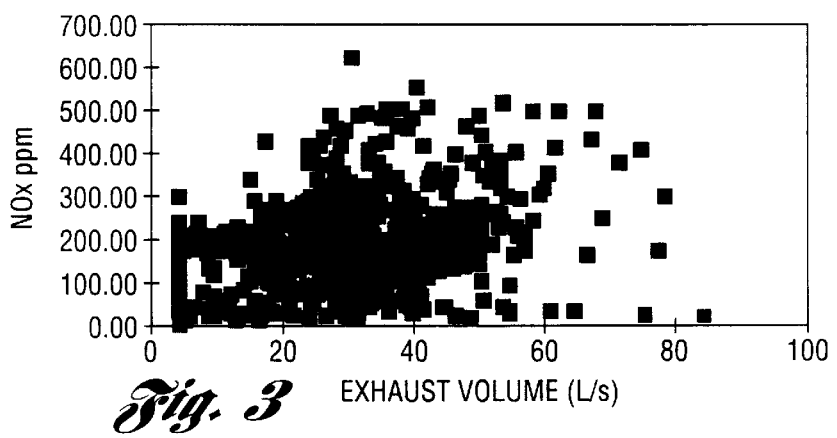
FIGS. 3 and 4 show $NO_x$ concentration (ppm) versus exhaust flow.
Figure 4:
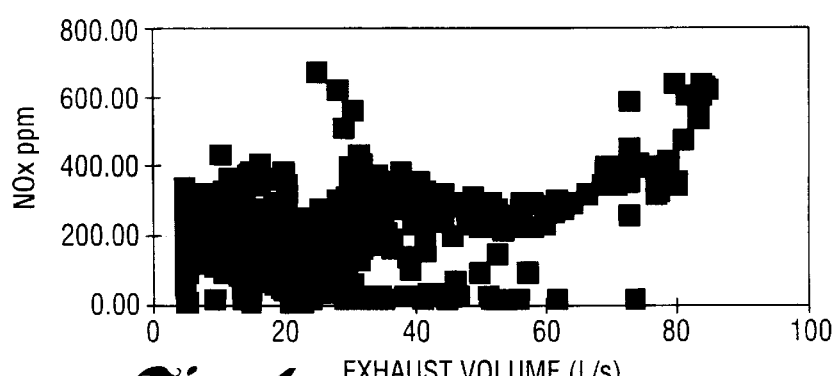
Figure 5:
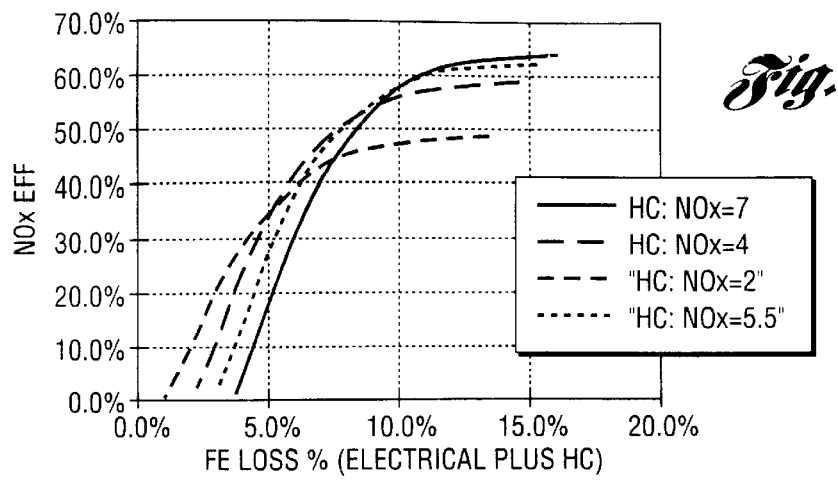
FIG. 5 shows predicted $NO_x$ conversion efficiency versus FE loss, counting both electrical and HC addition costs, with lines for various HC:$NO_x$ ratios (HC is measured in ppmC1)
Figure 6:
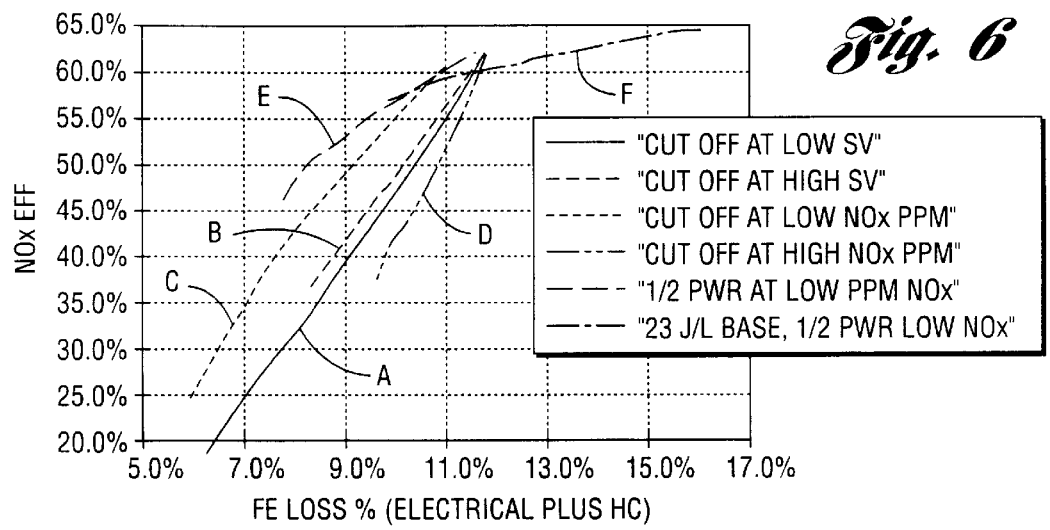
FIG. 6 shows a plot similar to that of FIG. 5, with lines representing different plasma power strategies.

Referring again to the drawings the concept of reducing plasma power during engine operation with high exhaust flow but low $NO_x$ concentration was modeled and the results are shown in FIG. 6. FIG. 5 shows predicted $NO_x$ conversion efficiency versus FE loss, counting both electrical and HC addition costs, with lines for various HC:$NO_x$ ratios (HC is measured in ppmC1). Along each line, the plasma power deposition (J/L) is varied from 0 to 25 J/L. A base condition of 5.5:1 HC:$NO_x$ ratio, and 15 J/L plasma energy was chosen.

The HC:$NO_x$ ratio needed for best $NO_x$ control is higher than is likely to exist in engine-out exhaust without some form of control to increase it. Various systems have been proposed to add (inject) fuel to the exhaust or employ a "post-injection" strategy, where fuel is injected in the engine late in the cycle (exhaust stroke) so that it does not get completely burned. Either of these strategies may be employed where needed to achieve the desired HC:$NO_x$ ratio.

FIG. 6 shows a plot similar to FIG. 5, with lines representing different plasma power strategies.

Plot A depicts a strategy of turning off plasma power at low space velocity (SV). The space velocity SV corresponds to the amount of exhaust gases flowing per unit time period. When the exhaust space velocity is below a selected value, the plasma power is turned off. The selected level varies along the line; the upper right selects a level of zero, i.e., no cutoff.

Plot B depicts a strategy of turning off plasma power at high SV. When the exhaust space velocity is above a selected value, the plasma power is turned off. The selected level varies along the line; the upper right selects a level of 1000, i.e., no cutoff.

Plot C depicts a strategy of turning off plasma power at low engine-out $NO_x$ concentration. When the engine-out $NO_x$ concentration is below a selected value, the plasma power is turned off. The selected level varies along the line; the upper right selects a level of zero, i.e., no cutoff.

Plot D depicts a strategy of turning off plasma power at high engine-out $NO_x$ concentration. When the engine-out $NO_x$ concentration is above a selected value, the plasma power is turned off. The selected level varies along the line; the upper right selects a level of 1000, i.e., no cutoff.

Plot E depicts a strategy of ½ plasma power at low engine-out $NO_x$ concentration. This strategy is similar to that depicted in Plot C, except instead of turning the power off completely, the power is turned down by a factor of 2.

Plot F depicts a strategy similar to that shown in Plot E, expect the base power is 23 J/L rather than 15 J/L as with all other lines in the FIG. 6.

Figure 7:
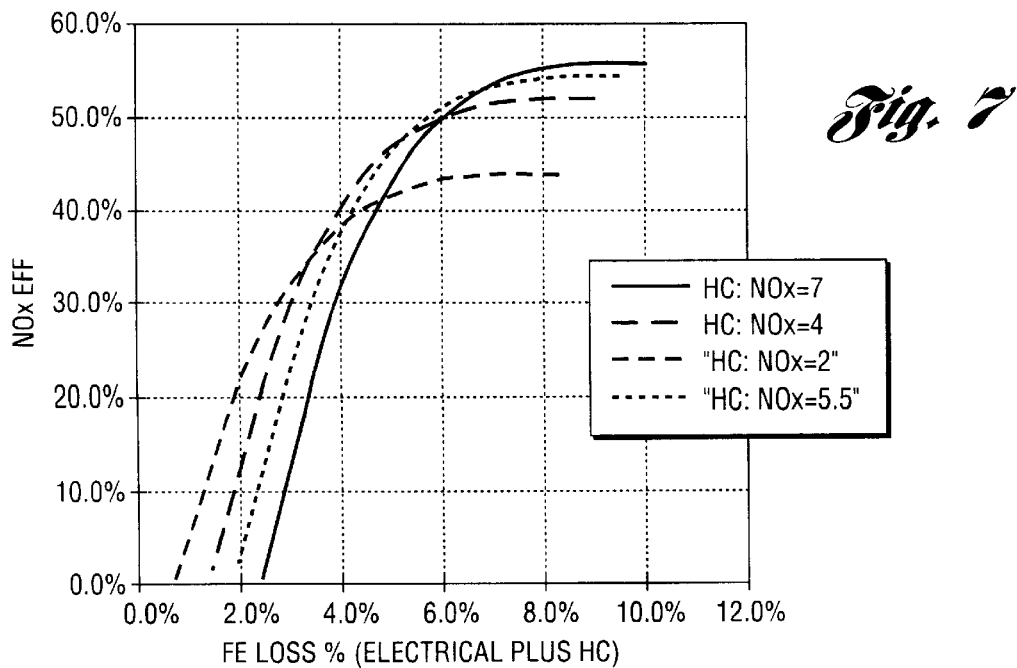
FIGS. 7 and 8 are similar plots for the MVEURO cycle.
Figure 8:
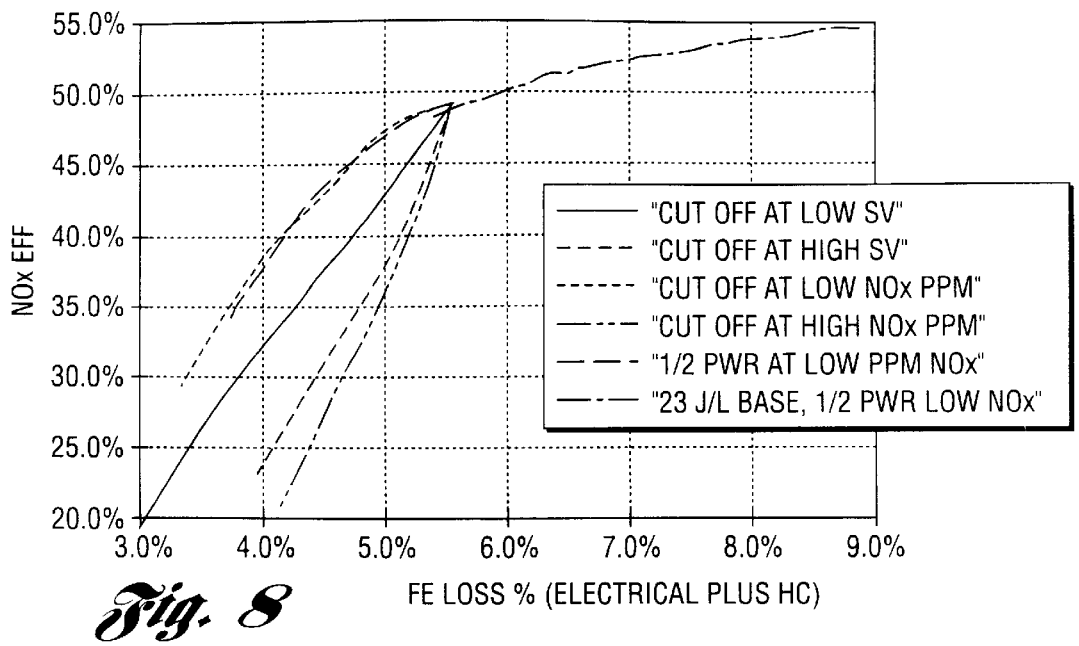

Compare, for example, the different FE loss at 50% $NO_x$ efficiency. The best strategy, shown in Plot E, loses 8% FE while the worst, shown in Plot D, loses 10.5%. The difference arises because the curves of efficiency versus J/L input are not linear, and the $NO_x$ concentration is not constant. Each unit of energy removes a larger amount of $NO_x$ when the $NO_x$ concentration is higher. FIGS. 7 and 8 are similar plots for the MVEURO cycle. Although peak $NO_x$ efficiency is lower on MVEURO, the energy cost is also lower.

Figure 9:
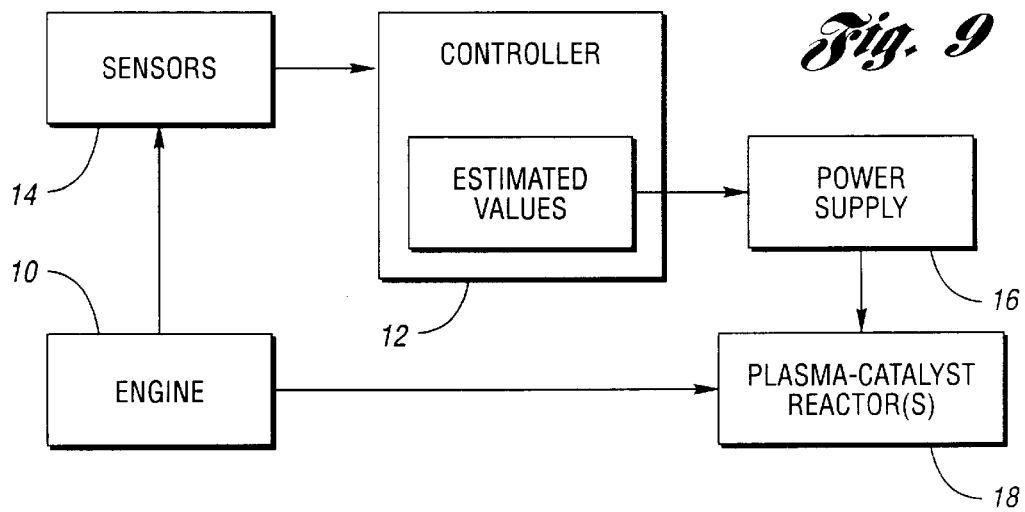
FIG. 9 is a schematic block diagram of the plasma-catalyst control system of the present invention.

Referring now to FIG. 9, a schematic block diagram of the invention for implementing a strategy of plasma power reduction is shown. An engine 10 is controlled by a controller 12 which reads a set of sensors 14 providing measured values of engine operating conditions. The sensors 14 include at least a subset of Engine position or speed Throttle or accelerator pedal position Air flow Manifold pressure Temperature (coolant, oil, and/or air)

Fuel flow

Exhaust composition including pollutants, before and/or after the plasma-catalyst device Any other available engine or vehicle operational parameter which can be sensed.

The measured values read into the controller 12 may be used to calculate estimated values that are not measured directly. For example, engine-out exhaust temperature can be estimated from fuel delivery, engine speed, and coolant temperature. In addition, programmed values of exhaust component thermal mass can be added to generate a calculated value of catalyst substrate temperature. Alternatively, estimated values of engine-out emissions (such as $NO_x$ or particulate matter) can be calculated based on measured values. These calculations can be made by regression analysis of test laboratory data, or from first principles models. They can be embodied in a controller in the form of equations, tables, logic diagrams, neural net control algorithms, etc. For example, catalyst temperature in current gasoline engine vehicles is estimated from other measured values. Furthermore, controls can be based in these indirect measurements without explicit calculation of the variable. For example, plasma power J/L can be modulated with a load parameter such as fuel charge per cylinder filling which may closely correlate with emission concentration, without actually calculating the emission concentration.

Figure 10:
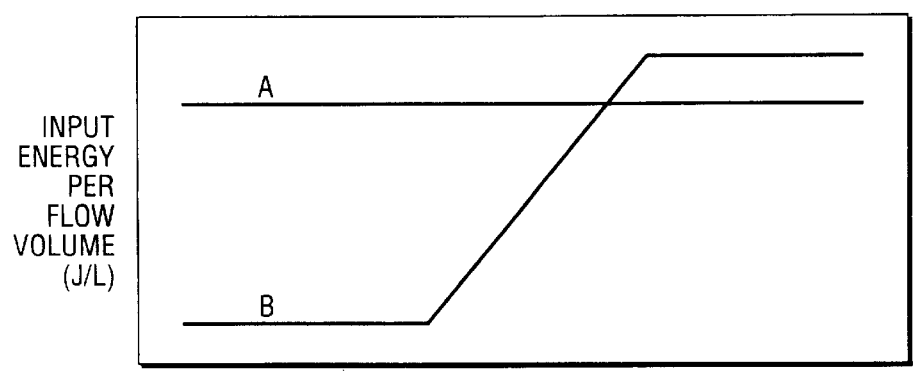
FIG. 10 is a plot of two strategies for conserving energy based on measured or estimated values of a relevant parameter.

Using either measured or estimated values, the application of plasma power from the power supply 16 to one or more plasma-catalyst reactors 18 is controlled to optimize emission reduction versus energy cost. The power supply 16 can be either of the pulsed and continuous wave type. In pulsed systems, the energy per pulse can be varied (by varying the voltage amplitude and/or duration), and the pulse period can be reduced (more pulses per unit time). In continuous wave systems, the energy can be controlled by controlling the voltage amplitude, or frequency. A typical strategy is shown in FIG. 10 where a constant energy is delivered to the plasma per standard volume (or mass) of engine exhaust. This corresponds to Line A in the plot. In so doing, energy efficiency is improved since the chemical conversion of a plasma-catalyst system varies with energy per volume, usually measured in Joules energy per Liter of exhaust.

Another strategy varies the J/L energy delivery in relation to a measured or estimated value of a relevant engine operating parameter, such as for example, engine-out and/or tailpipe $NO_x$ concentration. This strategy corresponds to Line B in the plot of FIG. 10. Under conditions of high $NO_x$ production, higher energy deposition is commanded, while under lower $NO_x$ conditions lower energy is commanded. This results in an improved energy cost versus emission performance, as shown on the graphs of FIGS. 5–8.

In addition to emission parameters such as $NO_x$, similar advantages are available by using other estimated variables such as engine output power or particulate mass generation. Engine power may be estimated by engine LOAD which may be calculated as $$\frac{\text{engine air flow per cylinder filling}}{\text{airflow per cylinder at maximum load}}$$

The numerator is calculated from an air meter (corrected for dynamic effects) and engine speed. The denominator is a parameter measured in the dynamometer lab and stored as a function of RPM, then corrected for barometric pressure. The parameter LOAD is well correlated with engine indicated torque. Simply multiplying torque by RPM would provide an indication of engine power.

While the best mode for carrying out the invention has been described in detail, those familiar with the art to which this invention relates will recognize various alternative designs and embodiments for practicing the invention as defined by the following claims.

What is claimed is:

1. A method of controlling power to a plasma-catalyst comprising a sequence of the steps of:

measuring vehicle operating parameters;

determining the value of at least one predetermined engine operating variable from the measured operating parameters; and controlling a power supply of at least one plasma-catalyst reactor to vary the power supplied to the plasma so that the energy deposited per unit exhaust volume (J/L) varies as a function of said operating variable to control emission reduction over a drive cycle in order to meet emission requirements with minimum energy cost wherein the engine operating variable is engine-out $NO_x$; and wherein the plasma power is turned off when the engine-out $NO_x$ concentration is above a selected value.

2. A system for controlling power to a plasma-catalyst comprising:

a plurality of sensors for measuring vehicle operating parameters; and a computer for determining the value of at least one predetermined engine operating variable from the measured operating parameters;

wherein said computer means controlling the output of a power supply of at least one plasma-catalyst reactor so that the energy deposited per unit exhaust volume (J/L) varies as a function of said operating variable to control emission reduction over a drive cycle in order to meet emission requirements with minimal energy cost wherein the engine operating variable is engine-out $NO_x$; and wherein the plasma power is turned off when the engine-out $NO_x$ concentration is above a selected value.

* * * * *

UNITED STATES PATENT AND TRADEMARK OFFICE
CERTIFICATE OF CORRECTION

PATENT NO.     : 6,363,714 B1
DATED          : April 2, 2002
INVENTOR(S)    : Hoard et al.

It is certified that error appears in the above-identified patent and that said Letters Patent is hereby corrected as shown below:

Title page,
Item [*] Notice, delete the phrase "by 0 days" and insert -- by 15 days --

Signed and Sealed this

Thirtieth Day of March, 2004

JON W. DUDAS
*Acting Director of the United States Patent and Trademark Office*